Feb. 22, 1966           M. MAYRATH           3,236,364
BOX HEAD AND DRIVE MOUNT FOR AUGER CONVEYORS
Filed July 2, 1962           2 Sheets-Sheet 1
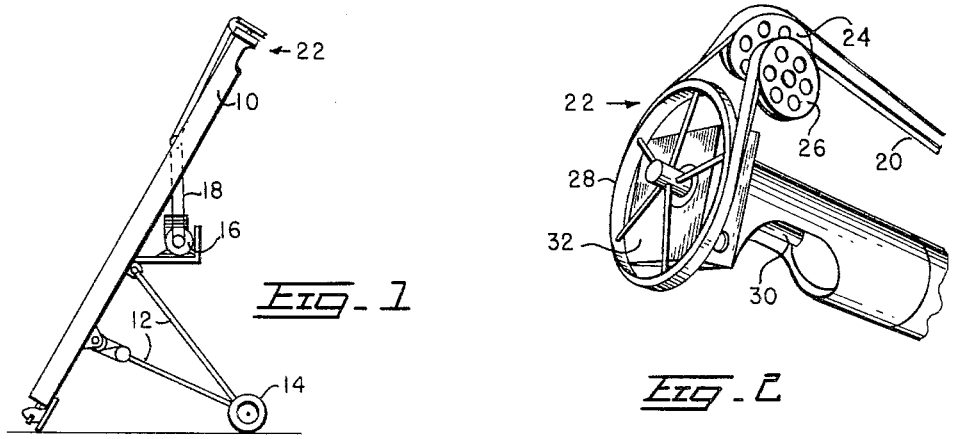
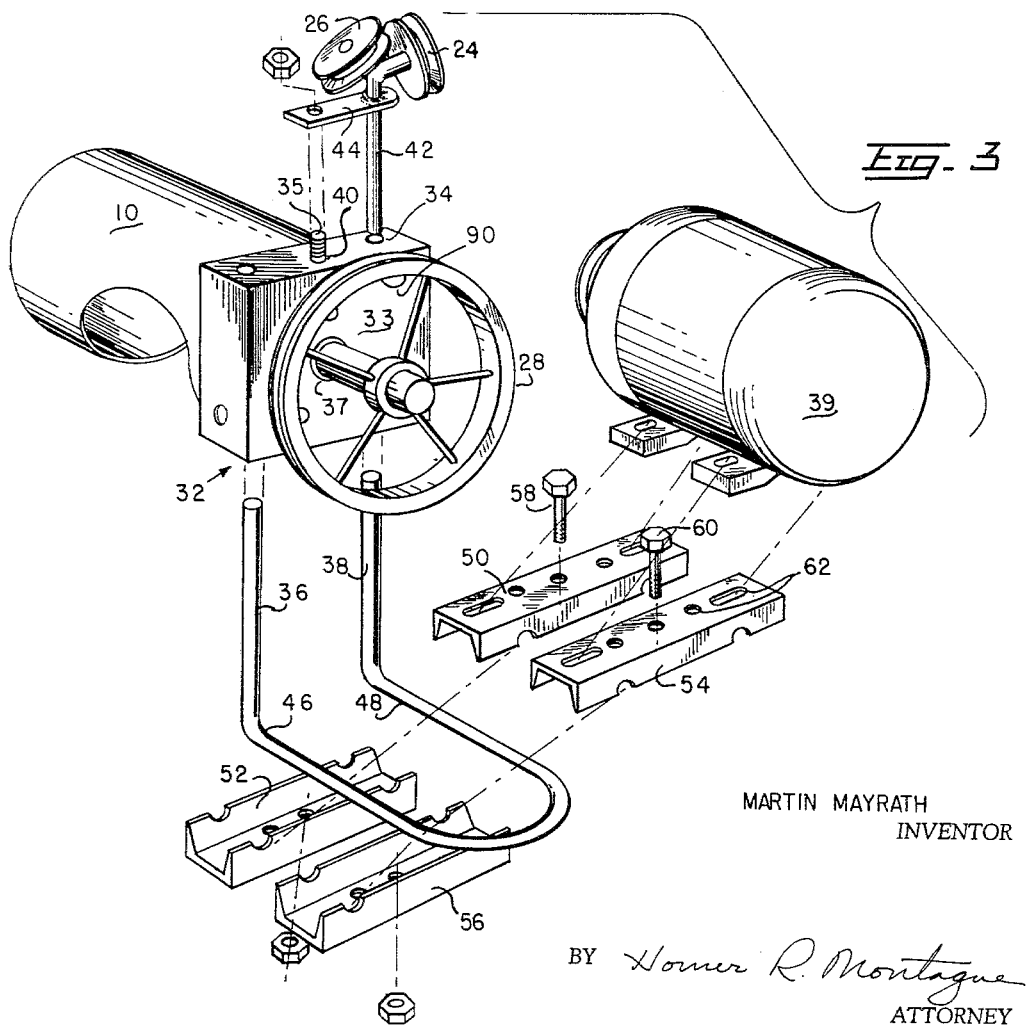
MARTIN MAYRATH
INVENTOR
BY Homer R. Montague
ATTORNEY Feb. 22, 1966  M. MAYRATH  3,236,364
BOX HEAD AND DRIVE MOUNT FOR AUGER CONVEYORS
Filed July 2, 1962  2 Sheets-Sheet 2
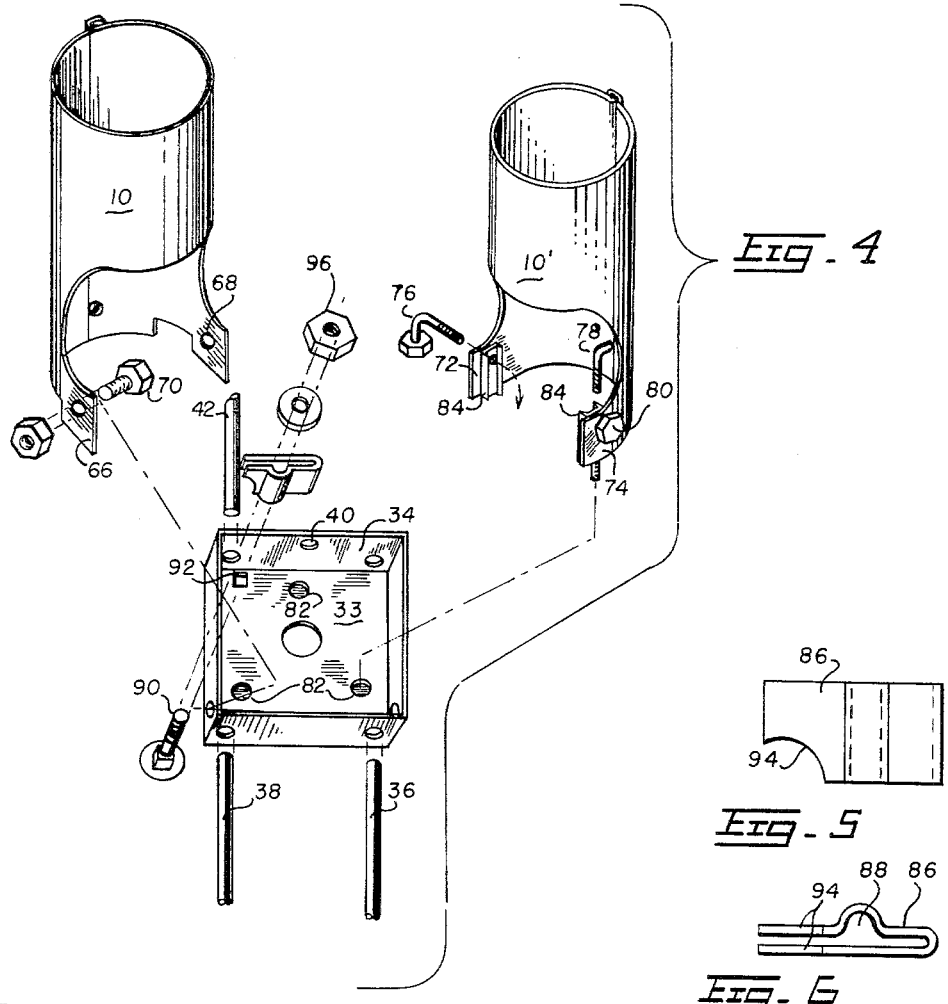
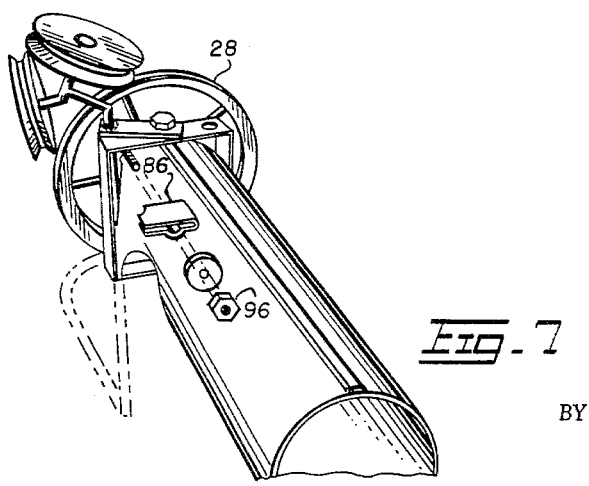
INVENTOR
MARTIN MAYRATH
BY Homer R. Montague
ATTORNEY 3,236,364
BOX HEAD AND DRIVE MOUNT FOR
AUGER CONVEYORS
Martin Mayrath, 10707 Lennox Lane, Dallas, Tex.
Filed July 2, 1962, Ser. No. 206,798
5 Claims. (Cl. 198—213)

This invention has to do with conveyors of the power driven type such as are widely employed as grain loaders, feed handling devices and the like, and especially to such conveyors as employ a rotary auger for the conveying element. Auger conveyors are manufactured in a wide variety of types and sizes, some being intended for mounting on wheeled frameworks, others being intended for relatively stationary (though physically movable) installations as truck and silo loaders, and so forth. It is often advantageous to provide a mounting means for the motor, engine or other prime mover directly suspended from the auger tube or casing, rather than carried as a separate device on a supporting framework or wheeled carriage.

Efficient manufacture, and the desirability of stocking a minimum number of different parts to permit assembly of various conveyor combinations, alike dictate the use, where possible, of component designs having a considerable degree of general applicability, or what might be called flexibility of application. The present invention has for its principal object the provision of a "universal" or multi-purpose head box and engine or motor mount for connection to an auger conveyor, providing numerous advantages of the type referred to above.

More specifically, it is an object of the invention to provide a head box incorporating the features of (a) rugged and sturdy connection to the "drive" end of a conveyor tube, (b) ready use with either of at least two different sizes (diameters) of auger tubes, (c) simple and rugged provision for the application of a universal type of motor mount when desired, (d) the inclusion of the necessary supports and bearings for the auger shaft, drive pulley and idler pulleys, and so on.

It is a further object of the invention to provide a construction as above described in whose fabrication only simple sheet-metal shapes and more or less standard fittings (of rod or tube stock) are needed, so that excessive tooling and manufacturing costs are avoided. The construction is preferably one in which galvanized components can be used exclusively, to provide a long service life for the equipment.

The above and other objects and advantages of the invention will best be comprehended from a consideration of the following detailed specification of a preferred embodiment of the invention, taken in connection with the appended drawings, in which:

FIG. 1 is a small-scale view of a typical conveyor or grain loader, furnished to illustrate the general environment of the novel head box and its auxiliaries.

FIG. 2 is a fragmentary view, to a larger scale, showing the head end of the conveyor in perspective as viewed from below.

FIG. 3 is an exploded view, to a still larger scale, showing the major parts of the construction in perspective, with certain optionally usable subassemblies.

FIG. 4 is similarly a perspective exploded view from a different viewpoint, and illustrating the manner in which a single head box can be secured to either of two different sizes of conveyor tubes.

FIG. 5 is a detail view in plan of an engine mount adjustment lock element.

FIG. 6 is a side view of the same element.

FIG. 7 is a perspective view looking into the open bottom of the head box, with parts shown exploded.

FIG. 1 of the drawings shows the general environment of the invention as applied to a wheeled grain loader or similar conveyor, including the auger tube 10 supported by a radial bar or tubular support structure 12 with ground wheels 14, a drive engine 16 carried from the auger tube, and belts 18, 20 transmitting the auger drive power from the engine to the driven end of the conveyor designated generally at 22. The illustration is given as an example of the application of the present invention to an auger conveyor, and is not intended to limit the applicability of the invention with reference to the details of the support and drive arrangements.

FIG. 2 shows the upper or driven end of the conveyor of FIG. 1 to a larger scale and in schematic fashion in that no support is visible for the idler pulleys 24 and 26 which guide the belt 20 about the auger driving pulley 28 secured to the auger shaft 30. A head box 32 is secured to the upper end of the auger tube 10 and there provides a support for the end bearing of the auger shaft and drive pulley, as well as performing other functions to be described below.

FIG. 3 shows the structure of FIG. 2 to a larger scale and from a different viewpoint, with some of the parts "exploded" for clarity. The head box 30 is economically fabricated as a bent-up or formed sheet metal (preferably galvanized) box having an end wall 33 to carry the shaft bearing 37 and skirts or side walls such as 34. Since one of the novel aspects of the construction is the use of the same head box in connection either with a relatively remotely situated engine such as indicated at 16 in FIG. 1 (which requires the use of idler pulleys) or with an engine or motor 39 mounted directly from the head box at the drive end of the conveyor, FIG. 3 illustrates both options.

The engine mount for direct support from the head box is shown in FIG. 3 as of "hairpin" construction, comprising a reversely-bent one-piece tube or bar whose free end portions 36 and 38 are parallel and thus adapted to pass through respective pairs of aligned holes in the walls of the head box 32. Two of these holes are visible in wall 34 of FIG. 3, and the other two are shown in FIG. 4 in the wall opposite to wall 34. The holes are positioned in these walls so that, when the ends 36 and 38 enter them, those ends will lie close to the box side walls which they parallel, and preferably also close to the end wall 33 of the box so that clearance will be provided for the end of auger tube 10 which (when the auger tube diameter is large enough to fill the space between the box walls) will be bolted to the side walls. When the engine mount as illustrated in FIG. 3 is employed, there is no need for the idler pulley assembly, and a third hole 40 in side wall 34 is positioned to receive one of the auger-tube bolts 35. When, however, the hairpin engine mount is not employed in the assembly, an idler system is needed, and this will now be described.

Still referring to FIG. 3, the idler pulleys 24 and 26 are shown as individually journalled on the diverging short legs of a Y-shaped support 42 whose central leg can pass into one of the holes in side walls 34. This leg of support 42 has welded thereto a securing and bracing lug 44 whose distal end can be secured to wall 34 as by the same bolt 35 that bolts the auger tube end against the inside surface of that wall 34 when the auger tube is of the maximum diameter size. As will appear below, a separate bolt will be used to secure lug 44 if a smaller diameter auger tube is being used.

The legs 46 and 48 of the motor or engine mount are clamped between opposed rails 50, 52 and 54, 56 as shown in FIG. 3 by the use of bolts 58, 60. Slots and/or holes such as 62 in these rails allow any of the standard engine or motor mounting bases to be secured to these rails, and an ample range of alignment adjustments is provided by sliding the rails along the legs 46 and 48, and sliding the engine base along the rails. The extent to which the ends 36 and 38 are slipped into the head box walls allows adjustment for belt length, ageing and shrinkage thereof, and so on. A lock for this last adjustment will be described below.

The composite exploded view of FIG. 4 is illustrative of the way in which the same head box can accommodate two different diameters of auger tubes, a larger (say a 6-inch diameter) tube 10 and a smaller (4⅝ inch) tube 10'. In both cases, the tube ends are cut to define the outlet port for the material being conveyed, and a part of the tube material is straightened to provide "ears" tangential to the circular arc of the tube ends for attachment to the head box. Considering tube 10, for example, the ears 66 and 68 will lie against the inner side walls of the head box and are bolted to those walls as by bolts 70. An intermediate connection is provided by the same bolt (passing through hole 40 in wall 34) as mentioned above with reference to the securement of the post 42 of the idler assembly. The end of the auger tube 10 may be cut away, as indicated, to clear the parts of elements 36, 38 and 42 which enter the head box.

When the head box is to be applied to the smaller tube 10', which has the ears 72 and 74, the connection is by means of three bent bolts 76, 78 and 80. These are inserted through the apertures in the tube end, and thence through respective holes in the head box wall 33. Since leakage of grain or other conveyed material would occur through these holes in the use of the box with the six-inch auger, the wall 33 is actually formed with dimpled or partially-struck-out circular areas 82 which maintain the box against leakage in the six-inch case, but are readily struck completely out for use with the smaller tube. It will be noted that while the bolt 78 passes through a hole preferably formed in the lock-seam area of the tube 10' and hence amply strengthened against any tendency to tearing under the pull-up tension in its bolt, the single-thickness ears 72 and 74 are reenforced by respective perforated lengths of channel iron 84 so dimensioned in length that as the nuts are pulled up tight, the end of the auger tube is first pulled into contact with the inner face of wall 33, and then the end of each reenforcing channel is pulled up tight against the same wall face. Tearing or crumpling of the tube by excessive tightening of the bolts is thus obviated.

A locking means for the motor mount bar 38 is detailed in FIGS. 5 and 6, and its application in the assembly is indicated in both FIG. 4 and FIG. 7. This device employs a clip 86 folded and deformed to present an arcuate or partially-cylindrical channel 88 to receive a square-shouldered stove bolt 90 whose shoulder seats non-rotatably in a square hole 92 in the box wall 33 (FIG. 4). One corner of the clip has a 90-degree arcuate cutout 94 sized to mate with the periphery of the bar end 38 when the nut 96 is tightened on bolt 90. Since the head bolt 90 lies outside the head box, the operator is thus relieved of the need to hold the head stationary when making adjustments of the locking device, which would otherwise be dangerous in view of the proximity to the bolt head of the belting and the drive pulley 28.

It will be seen that the construction disclosed satisfies the objects of the invention in a very simple, economical and efficient way, but it will also be appreciated that the construction can be varied, as to details, without departing from the scope of the invention, which scope is defined in the appended claims.

What is claimed is:

1. In an auger conveyor of the type having an auger, an auger shaft and an auger tube, a head box construction comprising a shallow sheet metal box having a square end wall and at least three side walls, an auger shaft bearing in said end wall, said auger shaft projecting through said bearing, and a drive pulley on said auger shaft beyond said end wall; said three side walls being apertured to receive bolts passed through the end of the auger tube snugly received within said side walls, and two oppositely disposed side walls of said box having aligned apertures to selectively receive and mount an idler pulley post or the spaced legs of an engine mount.

2. An auger conveyor in accordance with claim 1, said end wall having at least three knock-out aperture dimples spaced about said bearing to define an array of apertures spaced to receive connection bolts for an alternate auger tube of smaller diameter.

3. An auger conveyor in accordance with claim 1, and locking means carried by said head box for clamping engagement with a portion of one of said legs of the motor mount when the latter are inserted in said side wall apertures.

4. An auger conveyor in accordance with claim 3, in which said locking means comprises a clamp element secured to the end wall of said head box by a bolt having a square shoulder received in a square aperture in said end wall.

5. In an auger conveyor, a motor mount for cooperation with the generally rectangular head box of an auger conveyor as described in claim 1, comprising a U-shaped length of support rod having its free ends bent out of the plane of said U to define parallel leg sections lying in a plane perpendicular to the plane of said U and received in the apertures in respective opposed side walls of such a head box; and motor mounting rails adjustably positioned upon the legs of said support rod between the bends thereof and the loop connecting said legs.

References Cited by the Examiner

UNITED STATES PATENTS

| 477,291 | 6/1892 | Bomar | 292—305 |
| 824,667 | 6/1906 | Miller | 292—305 |
| 1,224,227 | 5/1917 | Snover | 174—65 |
| 1,316,684 | 9/1919 | Carter | 198—213 |
| 1,847,924 | 3/1932 | Calderwood | 175—65 |
| 2,551,147 | 5/1951 | Mayrath | 198—233 |
| 2,630,905 | 3/1953 | Howe | 198—213 |

FOREIGN PATENTS

| 803,838 | 11/1956 | Great Britain. |
| 850,850 | 10/1960 | Great Britain. |

SAMUEL F. COLEMAN, *Primary Examiner.*

WILLIAM B. LABORDE, ERNEST A. FALLER,
*Examiners.*